United States Patent
Yamauchi

(10) Patent No.: US 9,301,153 B2
(45) Date of Patent: Mar. 29, 2016

(54) RADIO RELAY APPARATUS, COMMUNICATION CONTROL METHOD THEREOF, AND COMMUNICATION SYSTEM

(71) Applicant: KYOCERA CORPORATION, Kyoto (JP)

(72) Inventor: Takanori Yamauchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 90 days.

(21) Appl. No.: 14/348,556

(22) PCT Filed: Sep. 28, 2012

(86) PCT No.: PCT/JP2012/006253
§ 371 (c)(1),
(2) Date: Mar. 28, 2014

(87) PCT Pub. No.: WO2013/046721
PCT Pub. Date: Apr. 4, 2013

(65) Prior Publication Data
US 2014/0254473 A1  Sep. 11, 2014

(30) Foreign Application Priority Data
Sep. 28, 2011  (JP) .................................. 2011-213021

(51) Int. Cl.
*H04W 16/26* (2009.01)
*H04B 7/155* (2006.01)

(52) U.S. Cl.
CPC ........... *H04W 16/26* (2013.01); *H04B 7/15507* (2013.01)

(58) Field of Classification Search
CPC .......................... H04W 16/26; H04B 7/15507
See application file for complete search history.

(56) References Cited

U.S. PATENT DOCUMENTS

| | | | |
|---|---|---|---|
| 7,072,337 B1* | 7/2006 | Arutyunov et al. | 370/389 |
| 2004/0109452 A1* | 6/2004 | Takihiro et al. | 370/392 |
| 2005/0041607 A1* | 2/2005 | Omae et al. | 370/310 |
| 2007/0008925 A1 | 1/2007 | Dravida et al. | |
| 2008/0192756 A1* | 8/2008 | Damola et al. | 370/400 |
| 2009/0092133 A1* | 4/2009 | Mok et al. | 370/389 |

(Continued)

FOREIGN PATENT DOCUMENTS

| | | |
|---|---|---|
| JP | 08-037685 A | 2/1996 |
| JP | 2000-287248 A | 10/2000 |

(Continued)

OTHER PUBLICATIONS

International Search Report; PCT/JP2012/006253; Dec. 4, 2012.

*Primary Examiner* — Brian D Nguyen
(74) *Attorney, Agent, or Firm* — Studebaker & Brackett PC

(57) ABSTRACT

The radio relay apparatus 1 stores MAC addresses of the radio terminals 2a and 2b and IP addresses assigned to the radio terminals 2a and 2b by the DHCP server 5 on the IP network 4 in the memory unit of the radio relay apparatus 1. The radio relay apparatus 1 monitors the information of MAC addresses and IP addresses of the source radio terminal and the destination radio terminal included in the packet routed through its own apparatus, and based on the address information stored in the memory unit, when it determines that the radio terminals 2a and 2b communicate each other via its own apparatus, transitions from the first communication mode over the IP network 4 to the second communication mode not over the IP network 4.

6 Claims, 4 Drawing Sheets

(56) References Cited

U.S. PATENT DOCUMENTS

| | | |
|---|---|---|
| 2009/0193103 A1* | 7/2009 | Small et al. .................... 709/221 |
| 2009/0238115 A1 | 9/2009 | Yamane |
| 2010/0020738 A1* | 1/2010 | Inouchi et al. ................ 370/315 |
| 2010/0172285 A1 | 7/2010 | Tokuyasu et al. |
| 2011/0004913 A1* | 1/2011 | Nagarajan et al. ................ 726/1 |
| 2012/0014316 A1* | 1/2012 | Rahman ........................ 370/328 |
| 2012/0069787 A1* | 3/2012 | Tamura ........................ 370/315 |

FOREIGN PATENT DOCUMENTS

| | | |
|---|---|---|
| JP | 2001-156694 A | 6/2001 |
| JP | 2007-174309 A | 7/2007 |
| JP | 2009-500957 A | 1/2009 |
| JP | 2009-232106 A | 10/2009 |
| WO | 2009/031282 A1 | 3/2009 |

* cited by examiner

RADIO RELAY APPARATUS, COMMUNICATION CONTROL METHOD THEREOF, AND COMMUNICATION SYSTEM

CROSS REFERENCE TO RELATED APPLICATION

This application claims priority to and the benefit of Japanese Patent Application No. 2011-213021 filed on Sep. 28, 2011, the entire contents of which are incorporated herein by reference.

FIELD

The present invention relates to a radio relay apparatus that relays radio communication between a terminal and a base station, a communication control method thereof, and a communication system.

BACKGROUND

When a radio terminal subordinate to WiMAX®-WiFi radio relay apparatus
(WiMAX-WiFi bridge) communicates with a radio terminal subordinate to the same radio relay apparatus, communication in a first communication mode by which communication is performed with WiMAX connection via IP network and communication in a second communication mode by which communication is performed through WiFi LAN connection are available, by disconnecting WiMAX connection and considering the radio relay apparatus as a WiFi access point. If radio terminals subordinate to the same radio relay apparatus exist and communicate each other at short range, they can communicate each other by switching between the two modes depending on the situation.

Furthermore, Patent Literature 1 discloses a method and an apparatus configured to seamlessly switch a mobile apparatus between WWAN including WiMAX and WLAN, such as WiFi.

CITATION LIST

Patent Literature 1: JP2009500957(A)

SUMMARY OF INVENTION

However, the conventional communication system has no function by which the radio relay apparatus prompts the radio terminal to switch to the second communication mode. Thus, after such the radio terminals are connected each other in the first communication mode over IP network and start communication and the like, even if they are subordinate to a radio relay apparatus and thus are in an environment in which they could communicate each other in the second communication mode, they cannot switch smoothly from the first communication mode to the second communication mode.

The present invention has been conceived, in light of the above problem, and to provide a radio relay apparatus capable of smoothly switching from the first communication mode that is performed over IP network to the second communication mode that is performed not over IP network. a communication method thereof and a communication system.

In order to achieve the above-described object, the present invention is characterized in that it provides a radio relay apparatus in a communication system including a server on the Internet, a radio relay apparatus and a plurality of radio terminals, in which the radio relay apparatus includes a memory unit configured to store the information of MAC addresses of the radio terminals and IP addresses assigned to the radio terminals by the server and a control unit configured to monitor the information of MAC addresses and IP addresses of a source radio terminal and a destination radio terminal included in packets routed through the radio relay apparatus (the apparatus itself), the control unit controlling, if it determines, based on the information of MAC addresses and IP addresses stored in the memory unit, that the radio terminals communicate each other via its own apparatus, so that the communication between the radio terminals is transitioned from the communication in the first communication mode over the Internet to the communication in the second communication mode over a local area network, not over the Internet.

If the communication quality drops to below a predetermined level or at least either one of the radio terminals is handed over during communication in the second communication mode, the control unit may preferably return the communication between the radio terminals from the communication in the second communication mode to the communication in the first communication mode.

Values representing the communication quality may preferably be at least one of RSSI (received signal strength), SINR (signal-to-interference noise ratio) and FER (frame error rate).

Furthermore, the present invention is characterized in that it provides a communication control method of a radio relay apparatus in a communication system including a server on the Internet, a radio relay apparatus and a plurality of radio terminals, including the steps of storing the information of MAC addresses of the radio terminals and IP addresses assigned to the radio terminals by the server in the memory unit, monitoring the information of MAC addresses and IP addresses of a source radio terminal and a destination radio terminal included in packets routed through its own apparatus, and controlling, when it determines, based on the information of MAC addresses and IP addresses stored in the memory unit, that the radio terminals communicate each other via its own apparatus, so that the communication between the radio terminals is transitioned from the communication in the first communication mode over the Internet to the communication in the second communication mode over a local area network, not over the Internet.

The communication control method according to the present invention may preferably include a step of, when the communication quality drops to below a predetermined level or at least either one of the radio terminals is handed over during communication in the second communication mode, returning the communication between the radio terminals from the communication in the second communication mode to the communication in the first communication mode.

Values representing the communication quality may preferably be at least one of RSSI (received signal strength), SINR (signal-to-interference noise ratio) and FER (frame error rate).

Furthermore, the present invention is characterized in that it provides a communication system composed of a server on the Internet, a radio relay apparatus and a plurality of radio terminals, the communication system including a first communication mode in which a radio terminal communicates with another radio terminal subordinate to the radio relay apparatus over the radio relay apparatus and the Internet and a second communication mode in which the radio terminal communicates with the other radio terminal subordinate to the radio relay apparatus over the radio relay apparatus, and the radio relay apparatus transitioning, when it determines that the radio terminals communicate each other via its own apparatus, the communication between the radio terminals from the communication in the first communication mode to the communication in the second communication mode.

When the communication level drops to below the predetermined level or at least either one of the radio terminals is handed over during communication in the second communication mode, the radio relay apparatus may preferably return the communication between the radio terminals from the communication in the second communication mode to the communication in the first communication mode.

Values representing the communication quality may preferably be at least one of RSSI (received signal strength), SINR (signal-to-interference noise ratio) and FER (frame error rate).

In the present invention, the radio resource of the network can be assigned to other radio terminals by controlling so that the communication is switched from the first communication mode over the IP network to the second communication mode not over the IP network, thus the radio resource is not wasted. Moreover, in the present invention, charge to a radio terminal user required for a higher radio communication in the first communication mode can be reduced by switching to the second communication mode.

DESCRIPTION OF EMBODIMENT

Figure 1:
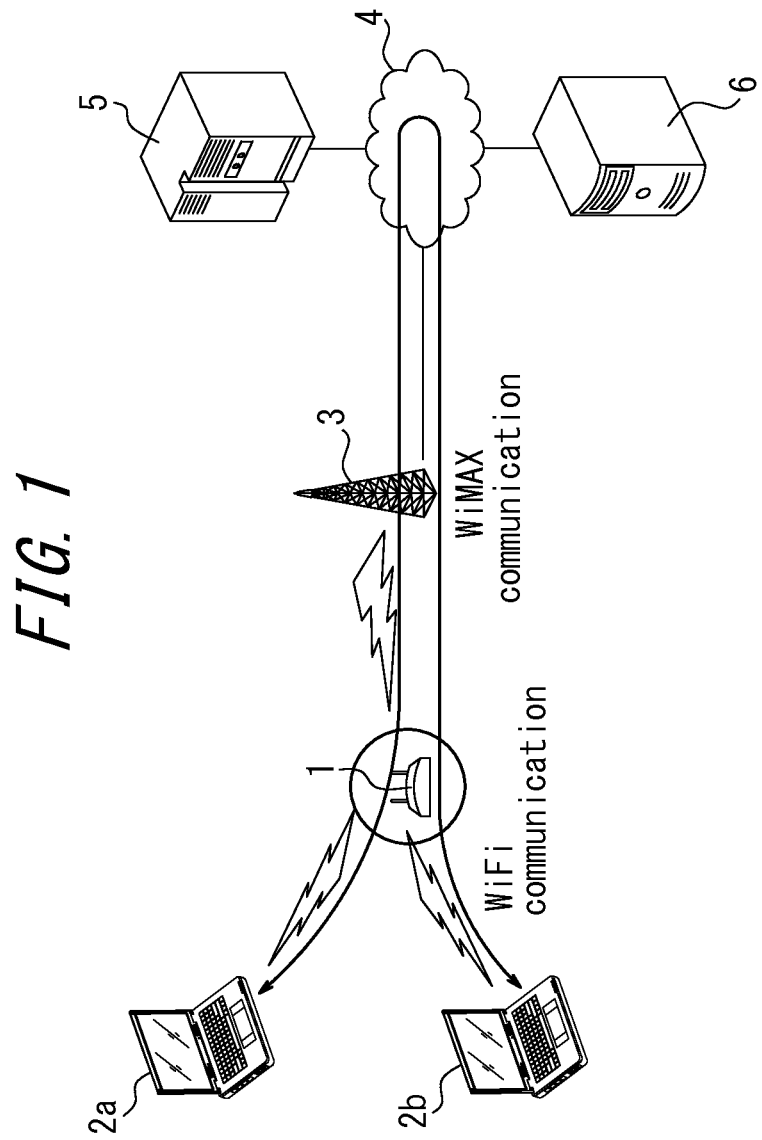
FIG. 1 is a diagram illustrating a configuration of a communication system in which a radio relay apparatus according to an embodiment of the present invention is used.

The embodiment of the present invention will be described with reference to the drawings. FIG. 1 is a diagram illustrating a configuration of a communication system in which a radio relay apparatus according to the present embodiment of the present invention is used. The radio relay apparatus 1 relays radio communication between the radio terminals 2a, 2b and the base station 3. The base station 3 is connected to the DHCP (Dynamic Host Configuration Protocol) server 5 and the service server 6 on the IP network 4, such as the Internet. The DHCP server 5 assigns IP addresses to the radio terminals 2 a and 2b and manages them. The service server 6 provides a service to the user of the radio terminals 2a and 2b.

Figure 2:
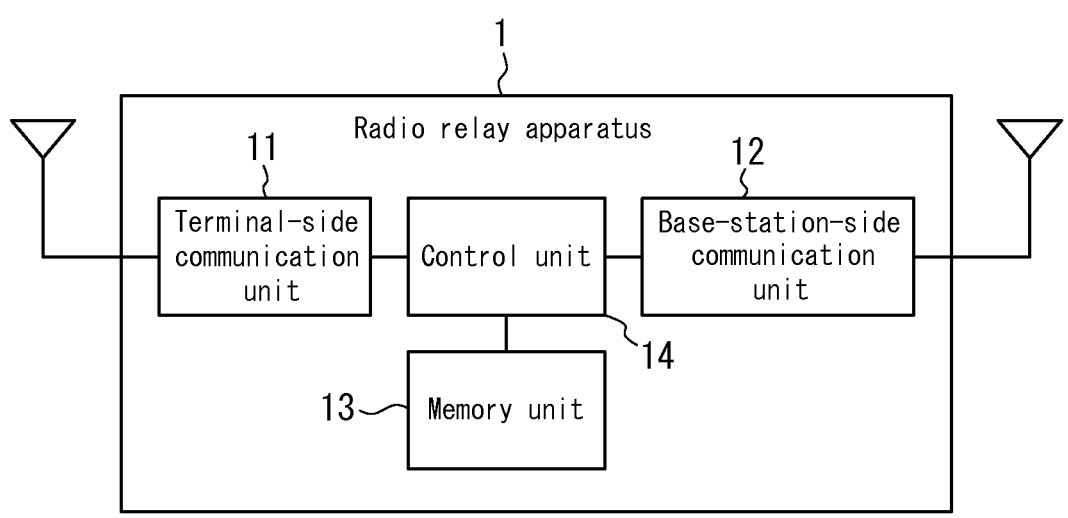
FIG. 2 is a schematic configuration diagram of the radio relay apparatus according to the embodiment of the present invention.

FIG. 2 is a schematic configuration diagram of the radio relay apparatus according to the embodiment of the present invention illustrated in FIG. 1. As illustrated in FIG. 2, the radio relay apparatus 1 includes a terminal-side communication unit 11, a base-station-side communication unit 12, a memory unit and a control unit 14. The terminal-side communication unit 11 communicates with the radio terminals 2a and 2b via WiFi, and the base-station-side communication unit 12 communicates with the base station 3 via WiMAX.

The memory unit 13 stores MAC addresses of the radio terminals 2a and 2b and IP addresses assigned to the radio terminals 2a and 2b by the DHCP server 5 on the IP network 4.

The control unit 14 monitors the information of MAC addresses and IP addresses of the source radio terminal and the destination radio terminal included in the packets routed through its own apparatus, and when it determines, based on the address information stored in the memory unit 13, that the communication between the radio terminals 2a and 2b is routed through its own apparatus, controls so that the communication between the radio terminals 2a and 2b is transitioned from the communication in the first communication mode in which communication is performed over the IP network 4 with WiMAX connection to the second communication mode in which communication is performed, not over the IP network 4, but through LAN connection of WiFi, by disconnecting WiMAX connection and considering its own apparatus as a WiFi access point. Furthermore, the control unit 14 controls, when the communication quality drops to below a predetermined level or at least either one of the radio terminals is handed over during communication in the second communication mode, so that communication between the radio terminals 2a and 2b is returned from the communication in the second communication mode to the communication in the first communication mode.

Figure 3:
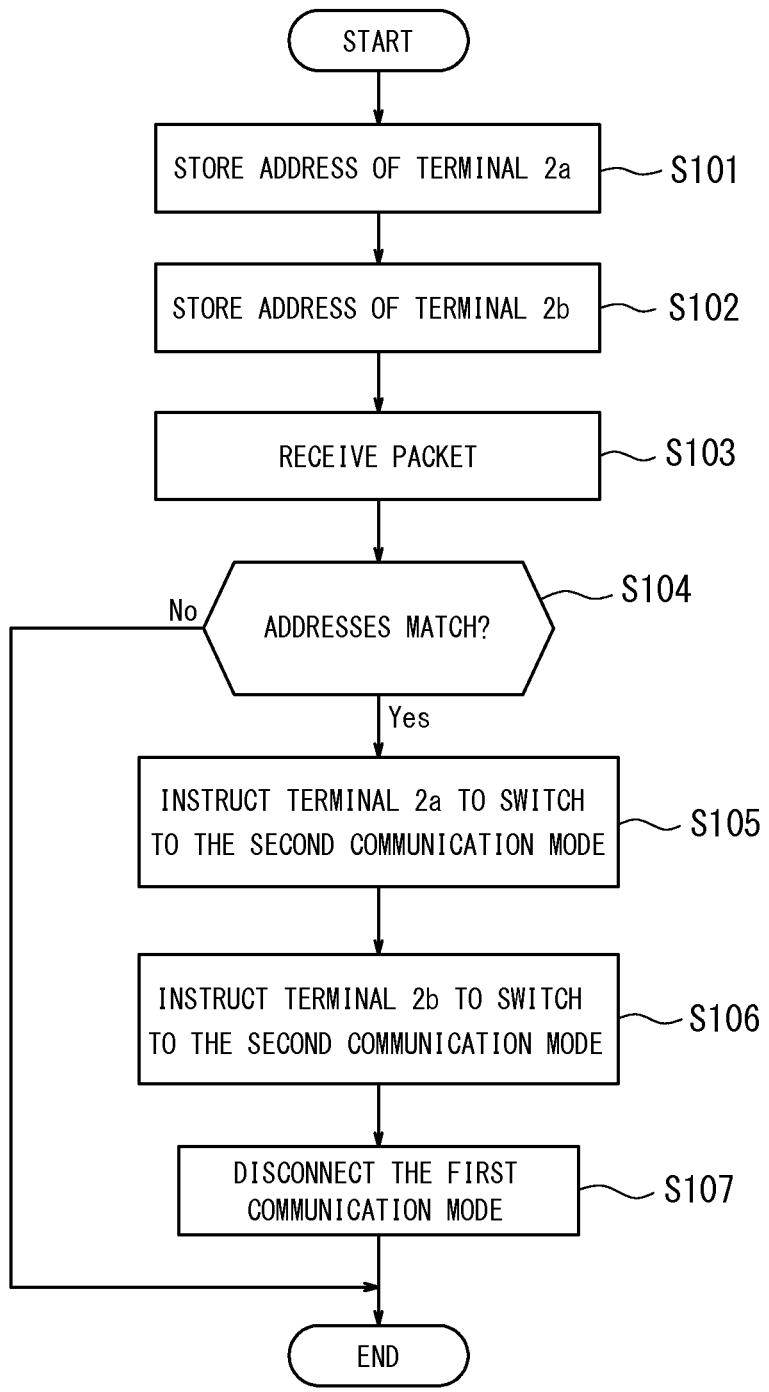
FIG. 3 is a flowchart illustrating an operation of the radio relay apparatus.

Next, operation of the radio relay apparatus according to the embodiment of the present invention will be described. FIG. 3 is a flowchart illustrating an operation of the radio relay apparatus. In FIG. 3, the case of a battle game where, the radio terminal subordinate to the radio relay apparatus is considered as a radio terminal for game having a radio function, and the radio terminal for game (hereinafter referred to as a terminal 2a) communicates with the other radio terminal for game (hereinafter referred to as a terminal 2b) present on the network, is taken for example to explain the operation of the radio relay apparatus. The terminals 2a and 2b have a function of switching the communication mode to the second communication mode.

First, the terminal 2a subordinate to the radio relay apparatus 1 obtains access to the service server 6 for game on the IP network 4 to play a battle game. At this time, the DHCP server 5 assigns an IP address to the terminal 2a, and the radio relay apparatus 1 stores MAC address and IP address of the terminal 2a in the memory unit 13 (S101).

Next, the terminal 2b subordinate to the radio relay apparatus 1 gains access to the service server 6 for game on the IP network 4 to play a battle game. At this time, the DHCP server 5 assigns an IP address to the terminal 2b, and the radio relay apparatus 1 stores MAC address and IP address of the terminal 2b in the memory unit 13 (S102).

Then, when the terminal 2a issues a challenge to fight a battle to the terminal 2b, the packet transmitted from the terminal 2a is forwarded to the other router via the radio relay apparatus 1, using the superordinate network, passes through hops and finally reaches the same radio relay apparatus 1 (S103).

The radio relay apparatus 1 monitors whether or not the Mac address (and the IP address) of the source terminal (terminal 2a) and the Mac address (and the IP address) of the destination terminal (terminal 2b) in the packet reaching its own apparatus match the Mac address (and the IP address) of the terminals 2a and 2b stored in the memory unit 13 (S104). If the addresses match, then the radio relay apparatus 1 recognizes that the terminal 2a and the terminal 2b exist subordinate to the apparatus itself.

If the addresses match and the radio relay apparatus 1 recognizes that the terminals 2a and 2b exist subordinate to its own apparatus, the radio relay apparatus 1 transmits the challenge issued by the terminal 2a to the terminal 2b, and transmits a message for encouraging switch to the communication in the second communication mode to the terminal 2a as well (S105).

Subsequently, when the radio relay apparatus 1 receives, from the terminal 2b, an acceptance of the challenge to fight a battle issued by the terminal 2a, the radio relay apparatus 1 transmits a message for encouraging switch to the communication in the second communication mode also to the terminal 2b (S106).

Figure 4:
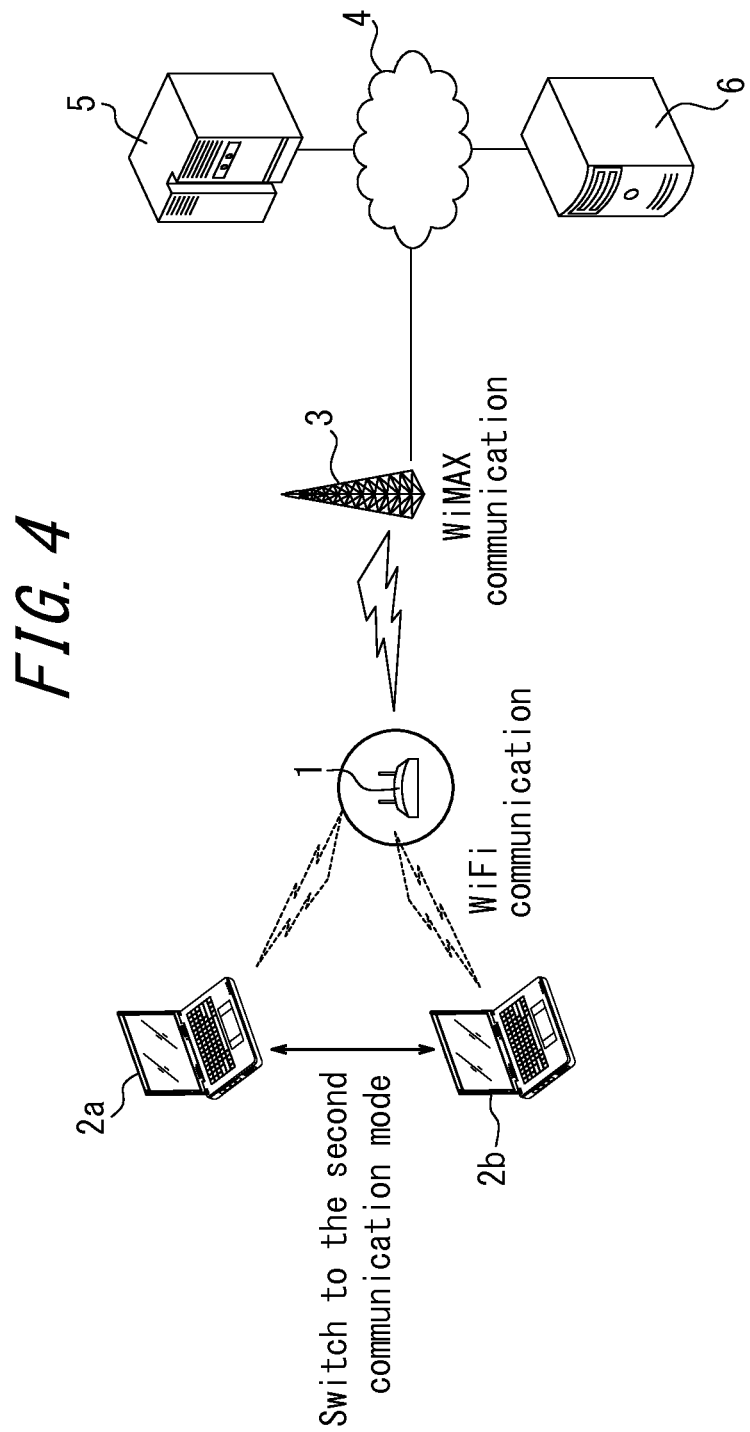
FIG. 4 is a diagram illustrating a state where the Internet connection in the first communication mode is disconnected and terminals communicate each other in the second communication mode.

When the terminals 2a and 2b start communication in the second communication mode, the radio relay apparatus 1 disconnects the Internet connection in the first communication mode over the IP network 4 (S107). FIG. 4 illustrates a state where the Internet connection in the first communication mode is disconnected and the terminals 2a and 2b communicate each other in the second communication mode.

Note that, if the communication quality drops to below a predetermined level or at least either one of the radio terminals is handed over during communication in the second communication mode, the radio relay apparatus 1 may return the communication from the second communication mode to the first communication mode. The communication quality is determined based on, for example, RSSI (Received Signal Strength Indicator), SINR (Signal to Interference and Noise Ratio), FER (Flame Error Rate) and the like. When the communication quality is determined based on FER, the larger the FER value becomes, the worse the communication quality becomes, and thus the radio relay apparatus 1 determines, if FER is greater than the predetermined threshold, that the communication quality is below the predetermined level.

Furthermore, as a message for encouraging the terminals 2a and 2b to switch to the communication in the second communication mode, an ICMP (Internet Control Message Protocol) redirect message may preferably be used. The message encouraging the terminals to switch is created by adding "an identifier encouraging the communication in a second communication mode" to the option field existed in the IP header of the ICMP redirect message.

As described above, in the radio relay apparatus according to the embodiment of the present invention, the radio terminals subordinate to the radio relay apparatus can switch each other between the first communication mode and the second communication mode freely based on the communication environment, and thus the radio resource of the network is not wasted. Moreover, the radio relay apparatus according to the embodiment of the present invention communicates in the second communication mode, thereby reducing charge to the radio terminal user required for a higher radio communication in the first communication mode.

REFERENCE SIGNS LIST

1 Radio relay apparatus
2a, 2b Radio terminal
3 Base station
4 IP network
5 DHCP server
6 Service server
11 Terminal-side communication unit
12 Base-station-side communication unit
13 Memory unit
14 Control unit

The invention claimed is:

1. A radio relay apparatus in a communication system including a server on the Internet, the radio relay apparatus and a plurality of radio terminals, the radio relay apparatus comprising:
a memory unit configured to store information of MAC addresses of the radio terminals and IP addresses assigned to the radio terminals by the server; and
a control unit configured to monitor the information of MAC addresses and IP addresses of a source radio terminal and a destination radio terminal included in a packet routed through the radio relay apparatus, wherein
the control unit controls, when the control unit determines, based on the information of MAC addresses and IP addresses stored in the memory unit, that the radio terminals communicate with each other via its own apparatus, so that the communication between the radio terminals is transitioned from communication in a first communication mode over the Internet to communication in a second communication mode not over the Internet but over a local area network, and
when communication quality drops to below a predetermined level or at least either one of the radio terminals is handed over during communication in the second communication mode, the control unit returns the communication between the radio terminals from the communication in the second communication mode to the communication in the first communication mode.

2. The radio relay apparatus according to claim 1, wherein a value representing the communication quality is at least one of RSSI (received signal strength), SINR (signal-to-interference noise ratio) and FER (frame error rate).

3. A communication control method of a radio relay apparatus in a communication system including a server on the Internet, the radio relay apparatus and a plurality of radio terminals, comprising the steps of:
storing information of MAC addresses of the radio terminals and IP addresses assigned to the radio terminals by the server in a memory unit;
monitoring the information of MAC addresses and IP addresses of a source radio terminal and a destination radio terminal included in a packet routed through its own apparatus;
controlling, when the control unit determines, based on the information of MAC addresses and IP addresses stored in the memory unit, that the radio terminals communicate with each other via its own apparatus, so that the communication between the radio terminals is transitioned from communication in a first communication mode over the Internet to communication in a second communication mode not over the Internet but over a local area network; and
when communication quality drops to below a predetermined level or at least either one of the radio terminals is handed over during communication in the second communication mode, returning the communication between the radio terminals from the communication in the second communication mode to the communication in the first communication mode.

4. The communication control method of the radio relay apparatus according to claim 3, wherein a value representing the communication quality is at least one of RSSI (received signal strength), SINR (signal-to-interference noise ratio) and FER (frame error rate).

5. A communication system comprising:
a server on the Internet;
a radio relay apparatus; and
a plurality of radio terminals, wherein
a first communication mode in which a radio terminal communicates with another radio terminal subordinate to the radio relay apparatus over the radio relay apparatus and the Internet; and
a second communication mode in which the radio terminal communicates with the other radio terminal subordinate to the radio relay apparatus over the radio relay apparatus, and wherein the radio relay apparatus transitions, when the radio relay apparatus determines that the radio terminals communicate with each other via its own apparatus, the communication between the radio terminals from the communication in the first communication mode to the communication in the second communication mode, and when communication quality drops to below a predetermined level or at least either one of the radio terminals is handed over during communication in the second communication mode, the radio relay apparatus returns the communication between the radio terminals from the communication in the second communication mode to the communication in the first communication mode.

6. The communication system according to claim 5, wherein a value representing the communication quality is at least one of RSSI (received signal strength), SINR (signal-to-interference noise ratio) and FER (frame error rate).

* * * * *